(12) United States Patent
Doutt

(10) Patent No.: US 8,763,989 B2
(45) Date of Patent: *Jul. 1, 2014

(54) THREE-WAY POPPET VALVE WITH INTERNAL CHECK FEATURE

(75) Inventor: Michael L. Doutt, Madison, AL (US)

(73) Assignee: Parker-Hannifin Corporation, Cleveland, OH (US)

( * ) Notice: Subject to any disclaimer, the term of this patent is extended or adjusted under 35 U.S.C. 154(b) by 346 days.

This patent is subject to a terminal disclaimer.

(21) Appl. No.: 12/873,377

(22) Filed: Sep. 1, 2010

(65) Prior Publication Data

US 2010/0327208 A1 Dec. 30, 2010
US 2012/0292549 A9 Nov. 22, 2012

Related U.S. Application Data

(60) Division of application No. 11/871,465, filed on Oct. 12, 2007, now Pat. No. 7,802,588, and a continuation-in-part of application No. 11/047,183, filed on Jan. 31, 2005, now Pat. No. 7,311,118.

(60) Provisional application No. 60/829,423, filed on Oct. 13, 2006.

(51) Int. Cl.
*F16K 1/00* (2006.01)

(52) U.S. Cl.
USPC .......................................... 251/332; 251/333

(58) Field of Classification Search
USPC ............................ 251/333, 334, 129.14, 332; 137/469–470
See application file for complete search history.

(56) References Cited

U.S. PATENT DOCUMENTS

| 1,686,849 A | * | 10/1928 | Frauenheim ................. 251/332 |
| 2,981,287 A | | 4/1961 | Caslow |
| 3,025,881 A | | 3/1962 | Freeman |
| 3,040,771 A | * | 6/1962 | Droitcour et al. ............. 137/469 |
| 3,043,335 A | | 7/1962 | Hunt |
| 3,087,675 A | | 4/1963 | Honegger |

(Continued)

FOREIGN PATENT DOCUMENTS

| DE | 195 09 776 A1 | 9/1996 |
| EP | 0 173 867 A2 | 3/1986 |
| GB | 2 096 279 A | 10/1982 |
| JP | 7-71642 | 3/1995 |

OTHER PUBLICATIONS

International Search Report of the International Searching Authority dated Aug. 8, 2008 for corresponding International Application No. PCT/US2007/081231, filed Oct. 12, 2007.

*Primary Examiner* — John Bastianelli
(74) *Attorney, Agent, or Firm* — Renner, Otto, Boisselle & Sklar L.L.P.

(57) ABSTRACT

A three-way poppet valve that can restrict or eliminate backflow without the use of an external check valve. Unlike conventional three-way poppet valves wherein both inlets can be open to the outlet at the same time during movement of the poppet, the valve according to the present invention can be configured to close both inlets prior to opening one of the inlets to the outlet. The valve features a poppet valve assembly that is operable to prevent both inlets from being open to the outlet at the same time. The valve assembly also reduces the force needed to close the valve against at least one of the inlets thereby allowing the use of a smaller actuator. A unique seal including a valve seat that is configured to conform to a valve member under sufficient pressure.

11 Claims, 22 Drawing Sheets

(56) References Cited

U.S. PATENT DOCUMENTS

| | | | |
|---|---|---|---|
| 3,148,707 A * | 9/1964 | Schildroth et al. | 138/31 |
| 3,371,907 A * | 3/1968 | Scaramucci | 251/175 |
| 3,395,890 A * | 8/1968 | Eckert et al. | 251/333 |
| 3,399,689 A * | 9/1968 | Keane | 137/220 |
| 3,523,676 A * | 8/1970 | Barker | 251/129.05 |
| 3,540,479 A | 11/1970 | Thompson | |
| 3,598,145 A * | 8/1971 | Wolfson | 251/333 |
| 3,884,259 A | 5/1975 | Hosmer et al. | |
| 3,974,861 A | 8/1976 | Goto et al. | |
| 4,432,215 A | 2/1984 | Yoshida | |
| 4,465,237 A | 8/1984 | Kupper | |
| 4,531,547 A | 7/1985 | Hadden | |
| 4,602,762 A * | 7/1986 | Koch et al. | 251/174 |
| 4,852,853 A | 8/1989 | Toshio et al. | |
| 4,872,481 A | 10/1989 | Shaw et al. | |
| 4,997,004 A | 3/1991 | Barkhimer | |
| 5,082,021 A | 1/1992 | Yonezawa | |
| 5,092,361 A * | 3/1992 | Masuyama et al. | 137/543.21 |
| 5,107,890 A * | 4/1992 | Gute | 137/539 |
| 5,211,198 A | 5/1993 | Tinholt | |
| 5,305,788 A | 4/1994 | Mayeux | |
| 5,361,805 A | 11/1994 | Mayeux | |
| 5,551,398 A | 9/1996 | Gibson et al. | |
| 5,558,129 A | 9/1996 | Mayeux | |
| 5,575,311 A | 11/1996 | Kingsford | |
| 5,628,293 A | 5/1997 | Gibson et al. | |
| 5,673,669 A | 10/1997 | Maley et al. | |
| 5,833,142 A * | 11/1998 | Caley | 239/453 |
| 5,899,232 A | 5/1999 | Cardoso et al. | |
| 5,901,749 A | 5/1999 | Watson | |
| 5,915,416 A * | 6/1999 | Okazaki et al. | 137/596.17 |
| 6,019,124 A * | 2/2000 | Sebion et al. | 251/362 |
| 6,065,495 A | 5/2000 | Fong et al. | |
| 6,095,188 A | 8/2000 | Anderson et al. | |
| 6,182,363 B1 | 2/2001 | Venable | |
| 6,244,253 B1 | 6/2001 | Haeberer et al. | |
| 6,286,880 B1 * | 9/2001 | Pratt | 294/68.25 |
| 6,363,966 B1 | 4/2002 | Browne | |
| 6,536,471 B2 | 3/2003 | Lechner-Fish et al. | |
| 6,575,187 B2 | 6/2003 | Leys et al. | |
| 6,619,321 B2 | 9/2003 | Reid, II et al. | |
| 6,651,693 B2 * | 11/2003 | Simmons et al. | 137/329.05 |
| 6,866,063 B2 | 3/2005 | Avila | |
| 6,871,668 B2 | 3/2005 | Moreno et al. | |
| 2003/0151018 A1 | 8/2003 | Teshima et al. | |
| 2005/0139801 A1* | 6/2005 | Ott | 251/359 |
| 2005/0217730 A1 | 10/2005 | Doutt | |

* cited by examiner

THREE-WAY POPPET VALVE WITH INTERNAL CHECK FEATURE

RELATED APPLICATIONS

This application is a divisional of U.S. patent application Ser. No. 11/871,465, filed Oct. 12, 2007, now U.S. Pat. No. 7,802,588 which claims the benefit of U.S. Provisional Application No. 60/829,423 filed Oct. 13, 2006, both of which are hereby incorporated by reference, and is also a continuation-in-part of U.S. patent application No. 11/047,183, filed Jan. 31, 2005, now U.S. Pat. No. 7,311,118, granted Dec. 25, 2007.

FIELD OF THE INVENTION

The present invention relates generally to valves. More particularly, the invention relates to poppet valves.

BACKGROUND OF THE INVENTION

Three-way poppet valves are common in the existing art and are used in many applications for controlling and directing the flow of liquids or gases from either one of two discrete inlet ports to a single common outlet port. They are commonly constructed with an axially movable poppet located inside a valve body with a cylindrical bore. A biasing shaft is connected to the poppet to transmit a bias force to the poppet. Common methods for applying the bias force to the shaft include springs, pneumatic or hydraulic cylinders, and solenoid coils.

In some constructions, the discrete valve inlets and seats are located at each end of the cylindrical bore of the valve body with the common outlet located between the two inlets. The valve poppet, with valve members on both ends, is biased against one seat at one end of the cylindrical bore to stop flow from that inlet while at the same time the poppet bias pulls the poppet sealing member away from the seat at the opposite end of the cylindrical bore allowing flow to commence from the one open discrete inlet to the common outlet. Reversing the bias of the poppet closes the open inlet and opens the closed inlet, thus allowing flow from the formally closed discrete inlet to the common outlet.

Elastomeric seats are commonly used in three-way poppet valves as the material provides for an excellent and reliable dynamic seal at both low and high fluid pressures. Because elastomeric materials are resilient, such seals generally require a minimal force to create a seal at either low or high fluid pressure. Many designs employ o-rings constrained in a groove on the poppet that seal either laterally against a cylindrical bore or as a face seal against a flat surface.

A distinct disadvantage typical of poppet valves of the construction just described becomes evident during the axial movement of the poppet when both inlets and the outlet can be in fluidic communication. Because the direction of fluid flow will always be from the high pressure port to the low pressure port, unintentional and undesirable backflow can occur through the lowest pressure inlet until the poppet completes its axial movement and pressure at the common outlet drops below the pressure at the open inlet. The typical solution for preventing backflow is to use one or more external check valves in the inflow lines.

Further, while elastomeric valve seats are adequate for many applications, they have limitations. For example, elastomers typically are not very resistant to abrasion and thus are prone to damage from contaminants in the fluids and wear from repeated valve cycling. Elastomers can also suffer from degradation caused by chemical attack or extreme low or high temperatures. Thermoplastic materials have sometimes been used as a replacement for elastomers when such conditions apply. However, thermoplastic materials, unlike elastomeric materials, are typically not resilient and therefore are not well suited to provide for a reliable dynamic seal.

SUMMARY OF THE INVENTION

The present invention provides a three-way poppet valve that can restrict or eliminate backflow without the use of an external check valve. Unlike conventional three-way poppet valves wherein both inlets can be open to the outlet at the same time during movement of the poppet, the valve according to the present invention can be configured to close both inlets prior to reopening one of the inlets to the outlet. Accordingly, the valve features a poppet valve assembly that is operable to prevent both inlets from being open to the outlet at the same time. The valve assembly also reduces the force needed to close the valve against at least one of the inlets thereby allowing a reduction in the size of the actuator. A unique seal including a valve seat that is configured to conform to a valve member under sufficient pressure is also provided.

According to one aspect of the invention, a three-way poppet valve comprises a valve body, and a valve assembly movable in a chamber of the valve body for controlling communication between a high pressure passage, a low pressure passage and an outlet passage. The valve assembly has a first valve member movable between an open and closed position to respectively permit or block flow through the high pressure passage, and a second valve member movable between an open and closed position to respectively permit or block flow through the low pressure passage. The second valve member is moved by the first valve member to the closed position when the first valve member is moved to the open position. When the first valve member is moved to the closed position, the second valve member remains in the closed position until a pressure differential between the chamber and the low pressure inlet reaches a prescribed criteria.

More particularly, the first and second valve members are supported on a valve stem connected to an actuator. The first valve member is supported for movement with the valve stem while the second valve member is supported on the valve stem for axial movement relative thereto.

The valve can be arranged in a plurality of configurations. For example, the first valve member can be biased towards its closed position, and the second valve member can be configured to open when the first valve member is in its closed position and the pressure in the chamber is less than the pressure at the low pressure inlet. In another configuration, the second valve member can be biased towards its open position such that the second valve member will open when the first valve member is in its closed position and the pressure level in the chamber is a prescribed amount greater than the pressure level at the low pressure inlet. In another configuration, the second valve member is biased towards its closed position such that the second valve member will open when the first valve member is in its closed position and the pressure level in the chamber is a prescribed amount less than the pressure level at the low pressure inlet.

Due to the second valve member moving independent of the first valve member, the force required to shift the first valve member from its open position to its closed position against the pressure in the high pressure inlet is a function of the cross-sectional area of the valve stem.

Both the low pressure inlet and the high pressure inlet can include a generally annular valve seat having a spherical surface against which a spherical surface on a respective valve element engages. The radius of curvature of the valve seat spherical surfaces can be greater than the radius of curvature of the valve member spherical surfaces. The valve seats can be formed of a thermoplastic material, for example.

In accordance with an aspect of the invention, a poppet valve comprises a valve body having a passage, a valve seat element supported by the valve body and having a thermoplastic radially inner spherical sealing surface, and a valve element supported for axial movement within the passage and having a spherical sealing surface for engaging the sealing surface of the valve seat. The spherical sealing surface of the seat element has a larger spherical diameter than the spherical sealing surface of the valve element.

More particularly, the seat spherical seal surface can be configured to deform under sufficient pressure applied thereto by the valve element to provide for a variable amount of seal area to be in contact with the valve element in order to maintain a contact stress above a minimum level required to provide for consistent seal tightness at low pressure while also providing for increased seal contact area in order to reduce seat stress and minimize plastic deformation of the valve element sealing surface at higher pressure. The valve seat element can be supported by the valve body such that upon application of sufficient pressure by the valve element to the valve seat sealing surface, at least a portion of the valve seat will extrude into a space between the valve body and the valve element providing for further increased seal contact area thereby to reduce seat stress and minimize plastic deformation of the valve element sealing surface at higher pressures. The valve seat element can be made of a non-resilient plastic material, such as a thermoplastic or a fluoroplastic material like PTFE of filled, unfilled or advanced copolymer grades, for example.

In accordance with another aspect of the invention a seal assembly for sealing a passageway in a valve comprises a plastic valve seat element having a radially inner spherical sealing surface and a valve element having a spherical sealing surface for engaging the sealing surface of the valve seat. The spherical sealing surface of the seat element has a larger spherical diameter than the spherical sealing surface of the valve element. The seat spherical seal surface can be configured to deform under sufficient pressure applied thereto by the valve element to provide for a variable amount of contact area with the valve element in order to maintain a contact stress above a minimum level required to provide for consistent seal tightness at low valve pressures while also providing for increased seal contact area in order to reduce seat stress and minimize plastic deformation of the valve element sealing surface at high valve pressures. The valve seat element can also be configured to extrude into a space between a valve body in which the valve seat is supported and the valve element providing for increased seal contact area thereby to reduce seat stress and minimize plastic deformation of the valve element sealing surface at higher valve pressures. The valve seat element can be made of a non-resilient plastic material, such as a thermoplastic or a flouroplastic fluoroplastic material like PTFE of filled, unfilled or advanced copolymer grades, for example.

DETAILED DESCRIPTION

Figure 1:
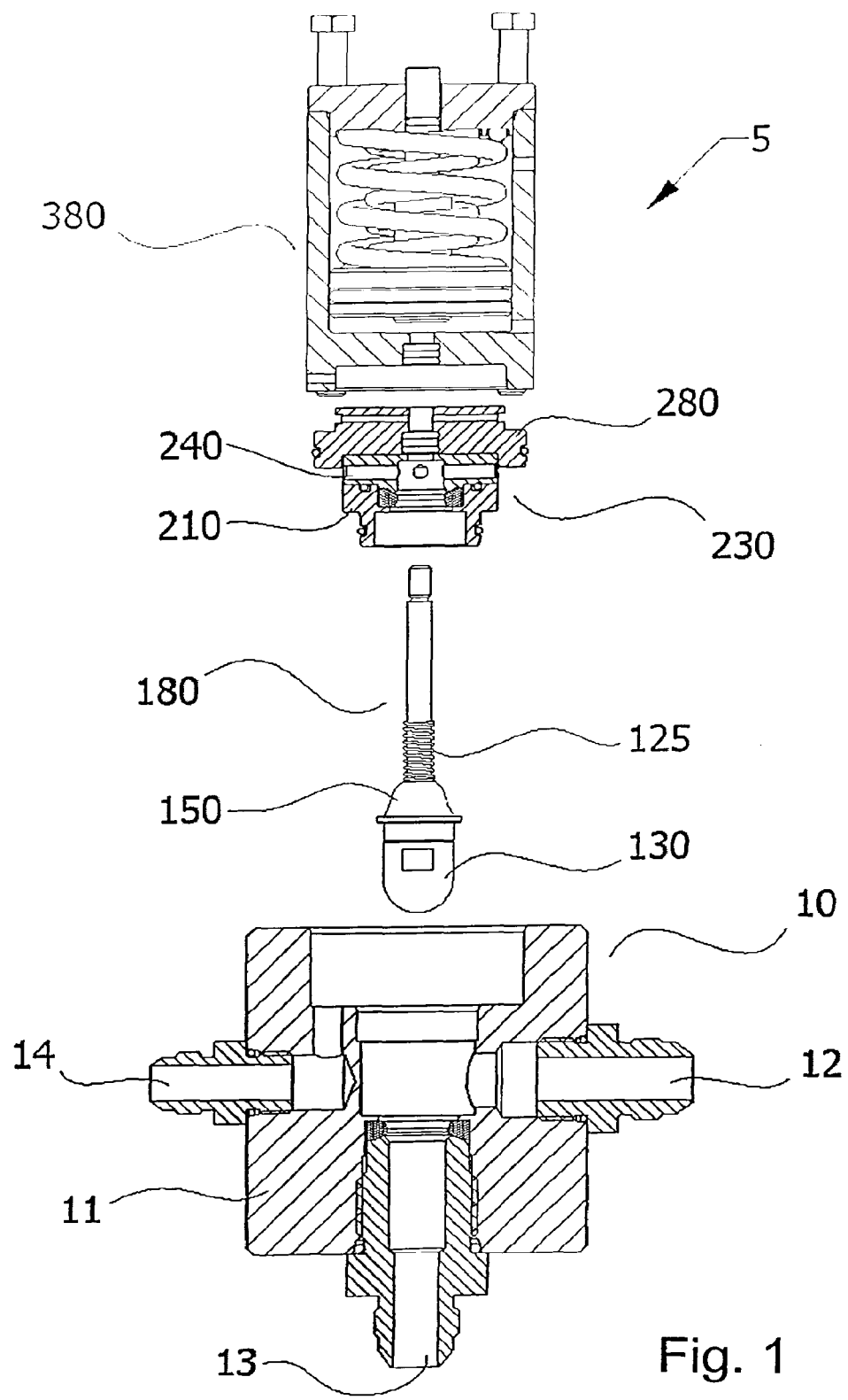
FIG. 1 an exploded partial cross-sectional view of an exemplary poppet valve assembly in accordance with the invention

Referring now to the drawings in detail, and initially to FIG. 1, the main components of the three-way poppet valve assembly 5 include a valve body assembly 10, a poppet assembly 180 for controlling fluid flow from inlet ports 13 and 14 through the valve body assembly 10 to common outlet port 12, a bonnet assembly 230 that seals the top of the valve body assembly 10 and provides a passage for fluid to flow from inlet port 14 to the outlet port 12, and an actuator assembly 380 for applying a biasing force to control the axial movement of the poppet assembly 180.

Now referring to FIGS. 2-8, the valve body assembly 10 includes a valve body 11 (See FIG. 9) having three fluid passages: common outlet port 12, inlet port 13, and inlet port 14. Inlet port 13 is relatively higher pressure inlet port and inlet port 14 is a relatively lower pressure inlet port (e.g., the pressure at inlet port 13 is higher that the pressure at inlet port 14). The common outlet port 12 and lower pressure inlet port 14 are configured to threadably engage respective port adapters 15 and 17 to allow connection to external piping using any preferred type of connection. Both port adapters 15 and 17 are sealed against internal pressure to the valve body 11 via an o-ring 40. The common outlet port 12 is directly fluidly connected to an innermost valve cavity 18. A vertical passage 25 directs flow from the low pressure inlet port 14 into an outermost cylindrical cavity 28 of the valve body 11.

Figure 11:
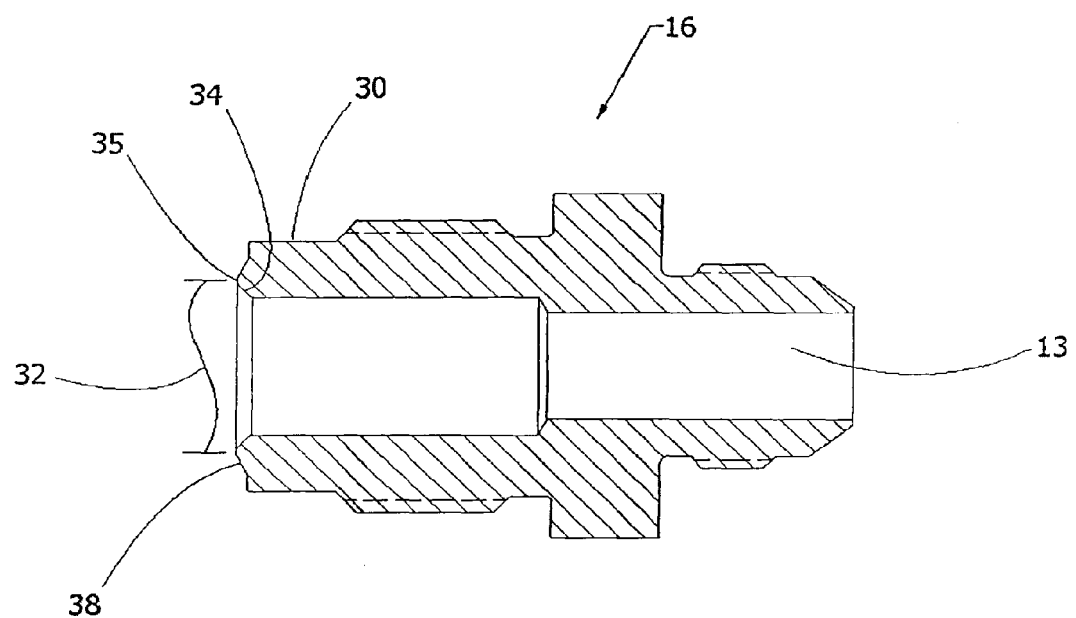
FIG. 11 is a cross-sectional view of an inlet port adaptor of the poppet valve assembly.

The high pressure inlet port 13 is directly fluidly connected to the innermost valve cavity 18 and is also configured to threadably engage a port adapter 16 (See FIG. 11) in a similar fashion as the other two ports 12 and 14. Inlet port 13 further includes a cylindrical counterbore 22 (see FIG. 9) which closely receives a lower seat 70 (see FIG. 3). The port adapter 16 (see FIG. 11) has an extended cylindrical portion 30 with a unique end facing, designed to allow the seat to flex under load applied by the poppet, that is closely received within the port counterbore 22 and which then forms the bottom of a wedge-shape cavity in which the lower seat 70 is contained. The length of the extended cylindrical portion 30 of the adapter 16 and the depth of the cylindrical counterbore 22 of the inlet port 13 are adjusted such that the lower seat 70 is slightly compressed in order to firmly clamp the seat 70 into position and establish a fluid tight seal between the seat 70, inlet port counterbore 22, and end face of the adapter 16.

Figure 8:
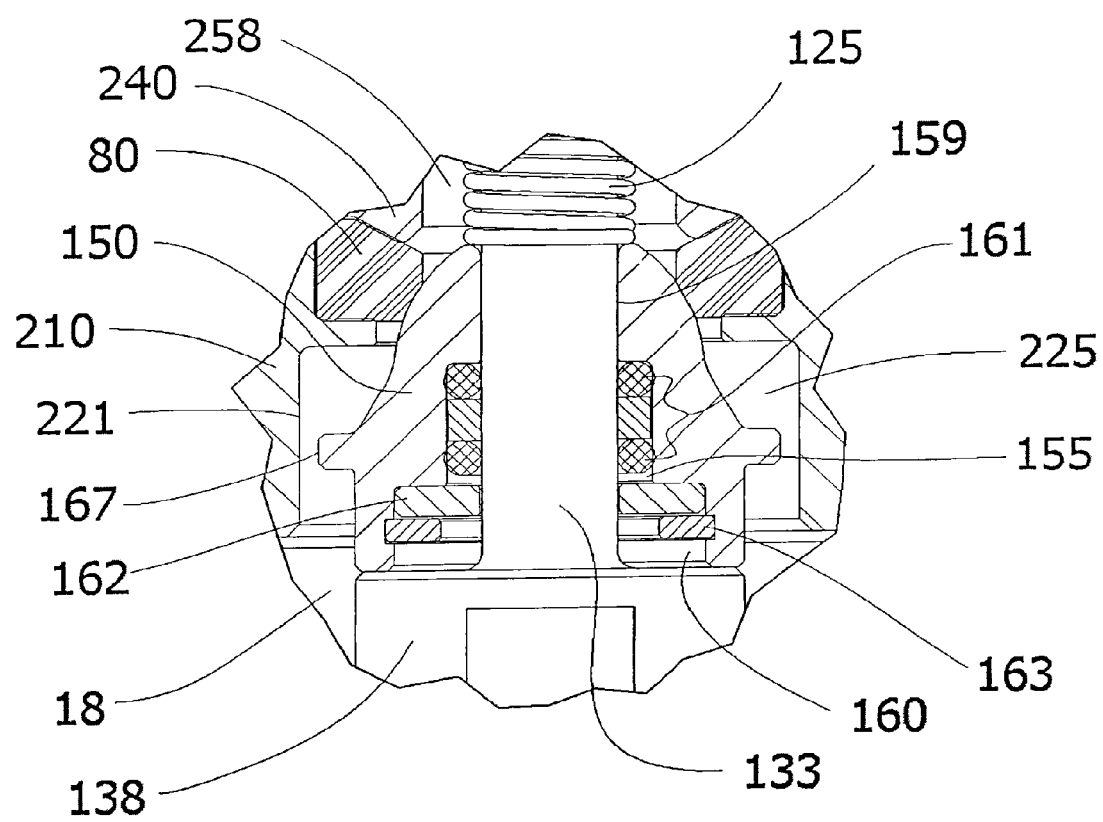
FIG. 8 is an enlarged portion of FIG. 2 showing the sliding poppet.
Figure 9:
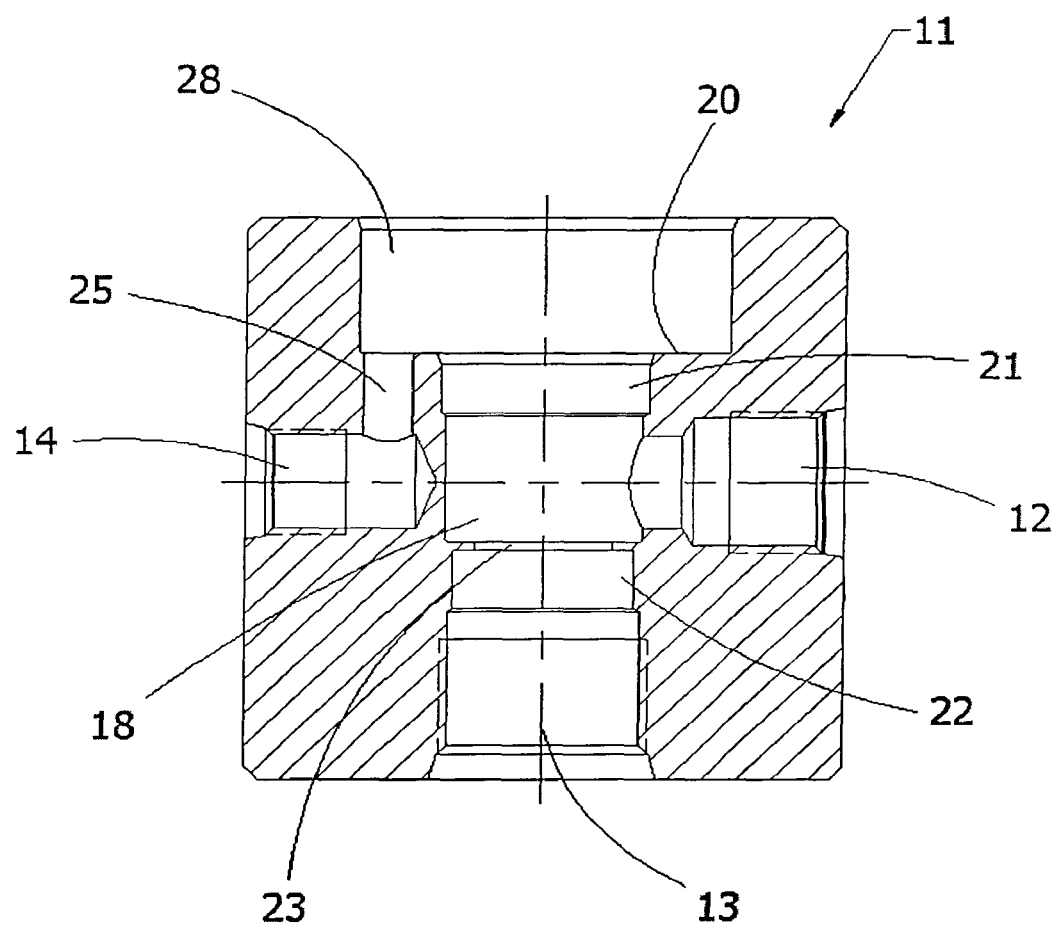
FIG. 9 is a cross-sectional view of a valve body of the poppet valve.
Figure 15:
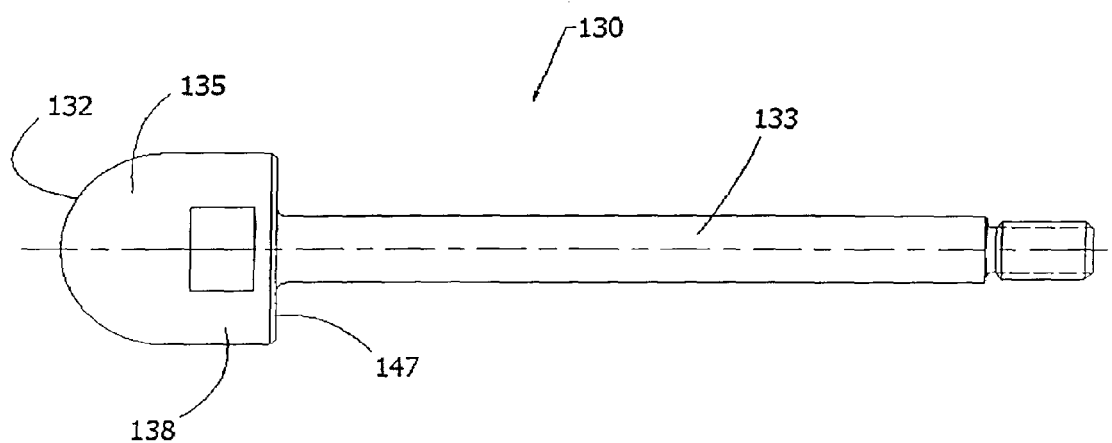
FIG. 15 is a cross-sectional view of a lower poppet of the poppet valve assembly.
Figure 16:
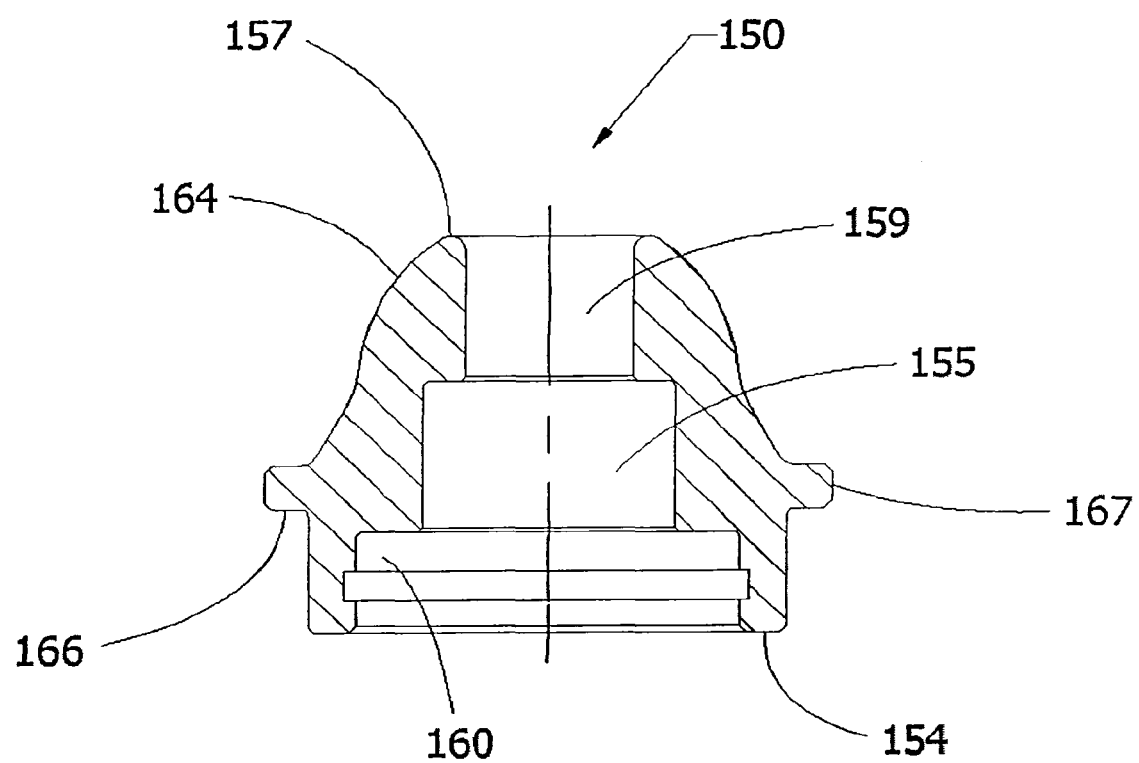
FIG. 16 is a cross-sectional view of a sliding poppet of the poppet valve assembly.
Figure 17:
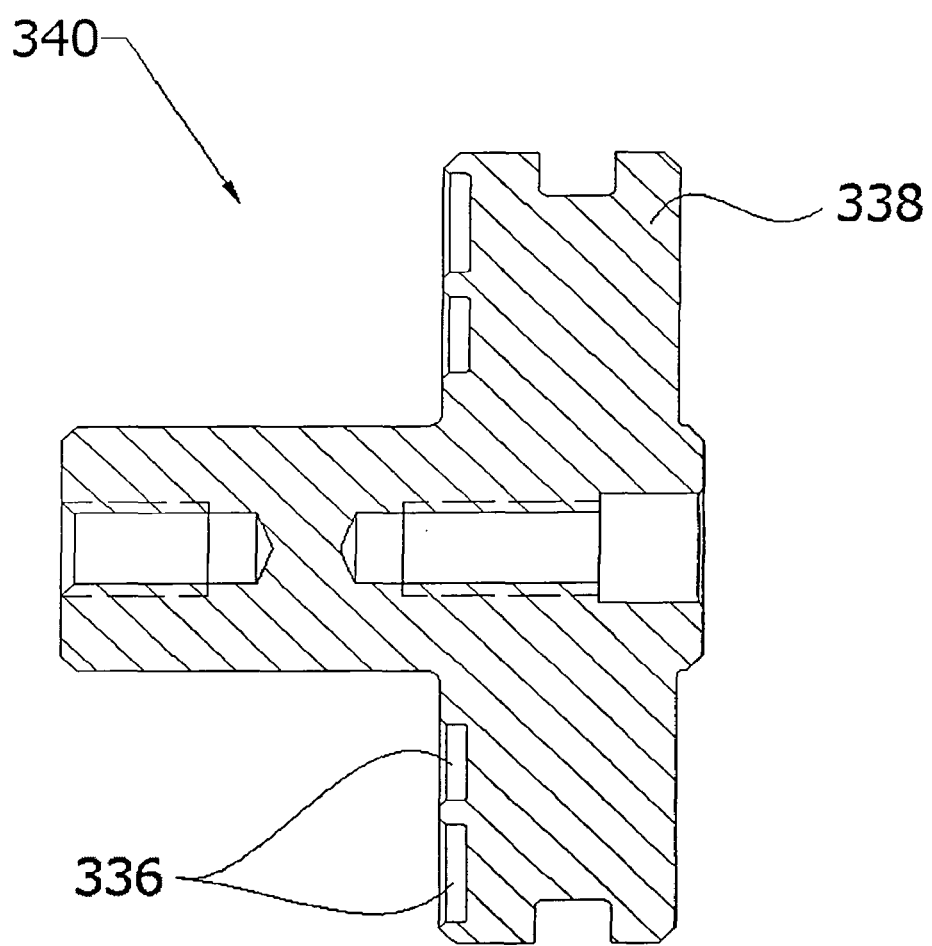
FIG. 17 is a cross-sectional view of a piston of the poppet valve assembly.

The poppet assembly 180 consists of a lower poppet 130, a sliding poppet 150 and a poppet spring 125. Referring to FIG. 15, the lower poppet 130 has at one end an enlarged cylindrical portion 138 with a spherical head 135. Extending from the base of the cylindrical portion 138 is an elongated cylindrical stem 133 with a threaded end that threadably engages an actuator piston 340 as will be described such that the piston 340 and the poppet assembly 180 move axially in conjunction with each other. With reference to FIGS. 8 and 16, the sliding poppet 150 has an internal bore 159 closely received to the lower poppet stem 133 such that it is free to independently move axially along the stem 133. A series of O-rings 161 or other packing is provided in a counterbore 155 to provide a fluid tight seal between the stem 133 and the sliding poppet 150. The series of O-rings 161 or other packing is contained inside the counterbore 155 with a bushing 162 and snap ring 163. The poppet spring 125 is positioned axially over the lower poppet stem 133 with one end abutted against a spherical tip 157 of the sliding poppet 150 and the opposite end abutted against a bottom surface of a counterbore 258 of an inner bonnet 240. In this configuration, the poppet spring 125 exerts a biasing force against the sliding poppet 150 to push it towards the cylindrical head 138 of the lower poppet 130.

Figure 12:
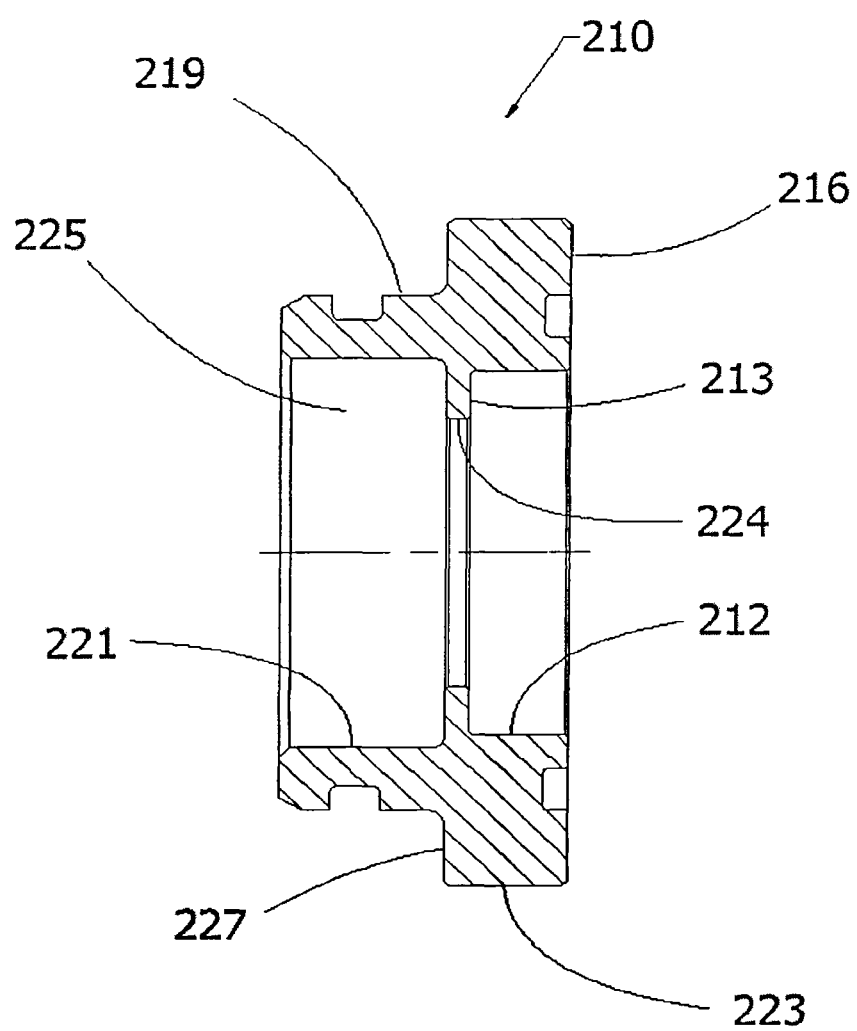
FIG. 12 is a cross-sectional view of a lower bonnet of the poppet valve assembly.

The bonnet assembly 230 includes a lower bonnet 210, an inner bonnet 240, and an upper bonnet 280. The lower bonnet 210 (see FIG. 12) has a cylindrical portion 219 closely received in a valve body bore 21 and a larger cylindrical portion 223 with an extending flat bottom portion 227 that mates against a flat bottom 20 of the outermost bore 28 of the valve body 11. An O-ring seal 275 is received within a groove in the lower bonnet 210 and provides a fluid tight seal between the lower bonnet 210 and the valve body 11. A counterbore 225 in the smaller cylindrical portion 219 receives the sliding poppet 150 with a defined clearance and depth which is discussed below. Opposite the counterbore 225 is a second counterbore 212 which closely receives an upper seat 80.

Figure 13:
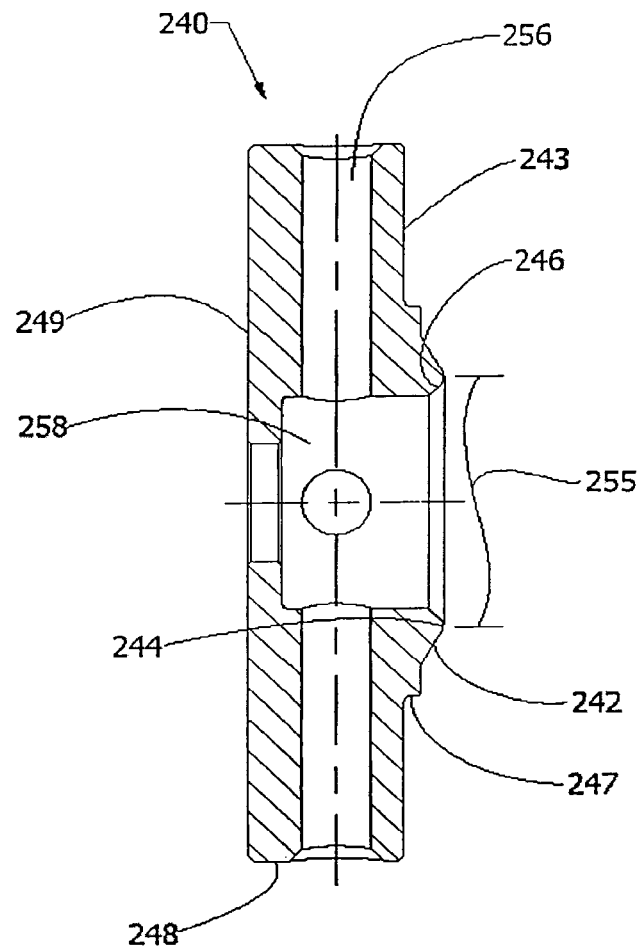
FIG. 13 is a cross-sectional view of an inner bonnet of the poppet valve assembly.

The inner bonnet 240 (see FIG. 13) has a cylindrical portion 247 closely received within the seat counterbore 212 of the lower bonnet 210 and a flat face 243 that mates against a top flat face 216 of the lower bonnet 210. The axial length of the cylindrical portion 247 is adjusted to form a cavity 28 (see FIG. 3) for the upper seat 80 such that the upper seat 80 is slightly compressed in order to firmly clamp the seat 80 into position and establish a fluid tight seal between the seat 80, the seat counterbore 212 and the unique end face of the inner bonnet 240, which will be discussed later. An o-ring backup seal 273 is received within a groove in the flat face 216 of the lower bonnet 210 to provide a secondary fluid tight seal between the lower bonnet 210 and the inner bonnet 240. Passages 256 extending radially from a central bore 258 to an outer diameter 248 provide a flow path for fluids from the low pressure inlet port 14 into the vertical passage 25 of the valve body 11 and into the flow cavity 28.

Figure 14:
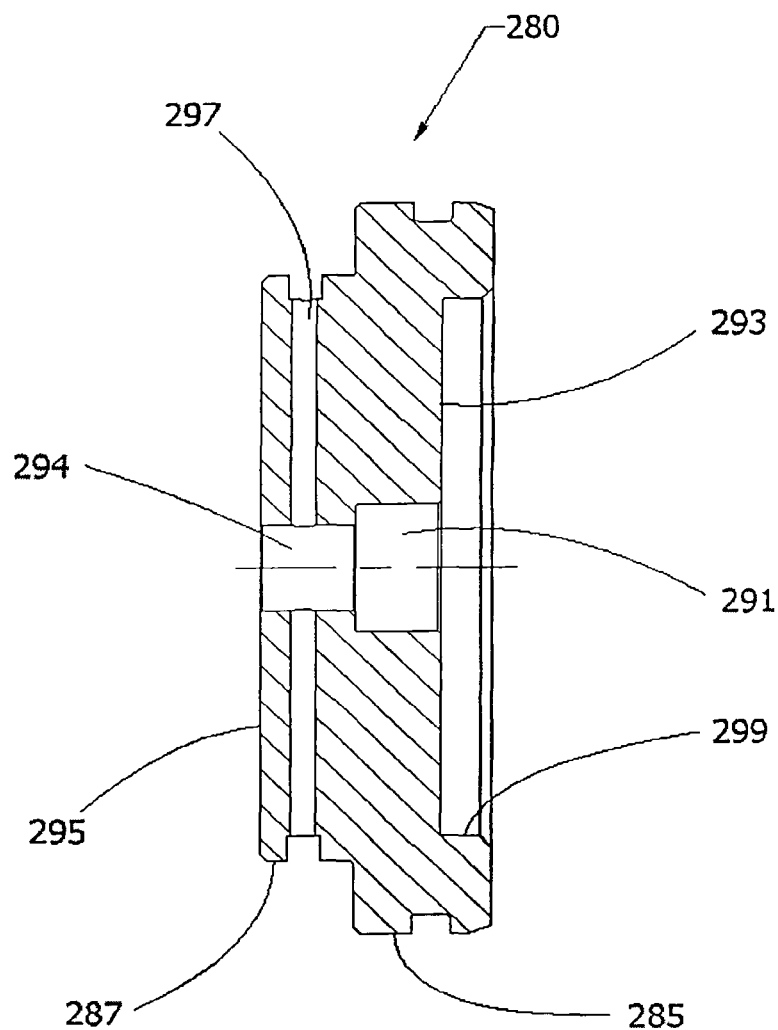
FIG. 14 is a cross-sectional view of an upper bonnet of the poppet valve assembly.

The inner bonnet 240 is closely received in a counterbore 299 of the upper bonnet 280 (See FIG. 14). A flat bottom 293 of the counterbore 299 mates against a flat top surface 249 of the inner bonnet 240. The upper bonnet 280 is closely received in the outermost bore 28 of the valve body 11. An O-ring seal 270 is received within a groove in the upper bonnet 280 and provides a fluid tight seal against internal valve pressure between the upper bonnet 280 and the valve body 11. A series of O-rings 120 or other packing is provided in a counterbore 291 to provide a fluid tight seal against internal valve pressure between the lower poppet stem 133 and upper bonnet 280. The series of O-rings 120 or other packing is contained inside the counterbore 291 by the top face 249 of the inner bonnet 240. A thru bore 294 of the upper bonnet 280 closely receives the lower poppet stem 133 and serves to center and guide the lower poppet stem 133 during axial movement. Passages 297 extending radially from the central through bore 294 into a groove around a outer diameter 287 provide a flow passage to a bleed port 392 in a housing 385 of the actuator assembly 380 for any fluid that should leak past a valve stem packing 120. The purpose of the bleed port 392 is to give an external indication of the valve stem packing 120 leakage and also to prevent high pressure fluid contained within the valve body cavities 18 and 28 from entering the actuator cavity 387 in the event that an actuator stem packing 320 is also compromised.

Figure 10:
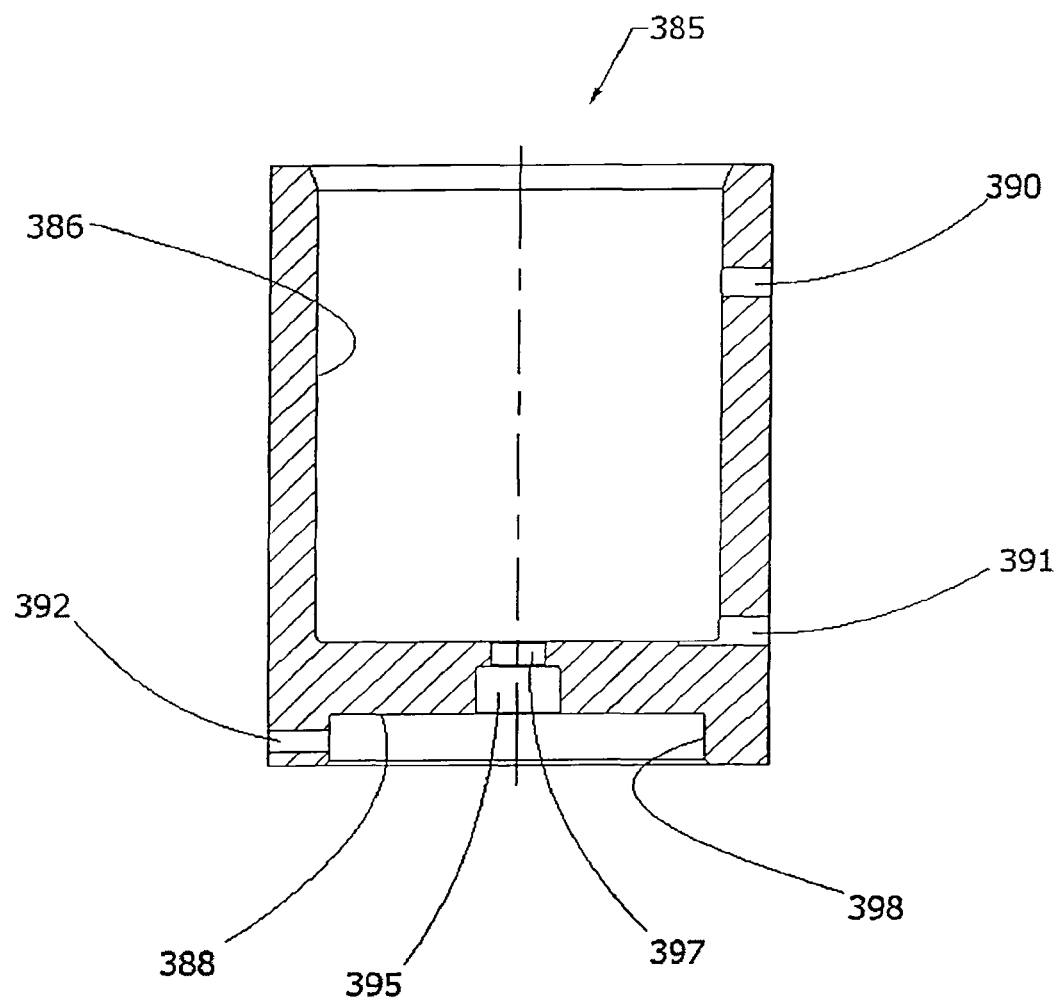
FIG. 10 is a cross-sectional view of an actuator housing of the poppet valve assembly.

The upper bonnet 280 is closely received in a counterbore 398 of the actuator housing 385 (See FIG. 10) with a flat top surface 295 of the upper bonnet 280 mating with a flat bottom surface 388 of the actuator housing counterbore 398. A series of O-rings 320 or other packing is provided in a counterbore 395 to provide a fluid tight seal against internal actuator pressure between the lower poppet stem 133 and the actuator housing 385. The series of O-rings 320 or other packing is contained inside the counterbore 395 by a top face 295 of the upper bonnet 280. A thru bore 397 of the actuator housing 385 closely receives the lower poppet stem 133 and serves to center and guide the lower poppet stem 133 during axial movement.

Referring back to FIG. 2, a cylindrical base 338 of the piston 340 is closely received in an actuator housing bore 386. An O-ring seal 342 is received within a groove and provides a fluid tight seal against internal actuator pressure between the piston 340 and the actuator housing bore 386. Return springs 351 and 354 are seated in grooves on a top face 336 of the piston base 338 and retained within the actuator housing 385 by an actuator cap 370. Four bolts 400 securely retain the actuator assembly 380 and the bonnet assembly 230 to the valve body assembly 10.

The piston 340 is axially moveable within the actuator housing bore 386. The direction of piston movement is effected by a net bias force composed of the bias force applied by the fluid pressure in an actuation cavity 387 and the bias force applied by the return springs 351 and 354. The poppet assembly 180, being threadably engaged to the piston 340, moves axially in conjunction with the piston 340. As shown in this embodiment, the return springs 351 and 354 urge the piston 340 downwardly toward the valve body assembly 10. However, the orientation of the piston 340 can be reversed such that the return springs 351 and 354 will urge the piston 340 upwardly toward the bonnet assembly 230.

The described poppet valve minimizes or eliminates undesirable backflow from the high pressure inlet port 13 into the lower pressure inlet port 14 during the axial movement of the poppet assembly 180 when both inlet ports 13 and 14 and the common outlet port 12 are in fluidic communication. In general, a specific pressure arrangement should be applied for the valve to function as desired. The higher pressure fluid supply should access the valve through the bottom inlet port 13. The lower pressure fluid supply should access the valve through the side inlet port 14. The common outlet port 12 typically should continuously drain fluid pressure such that when the lower poppet 130 closes against the high pressure seat 70, the internal valve cavity 18 pressure will continue to decrease until the pressure is slightly above or below the fluid pressure in the low pressure inlet port 14. The reason for such pressure arrangement should be evident in the following discussion of valve function.

Figure 2:
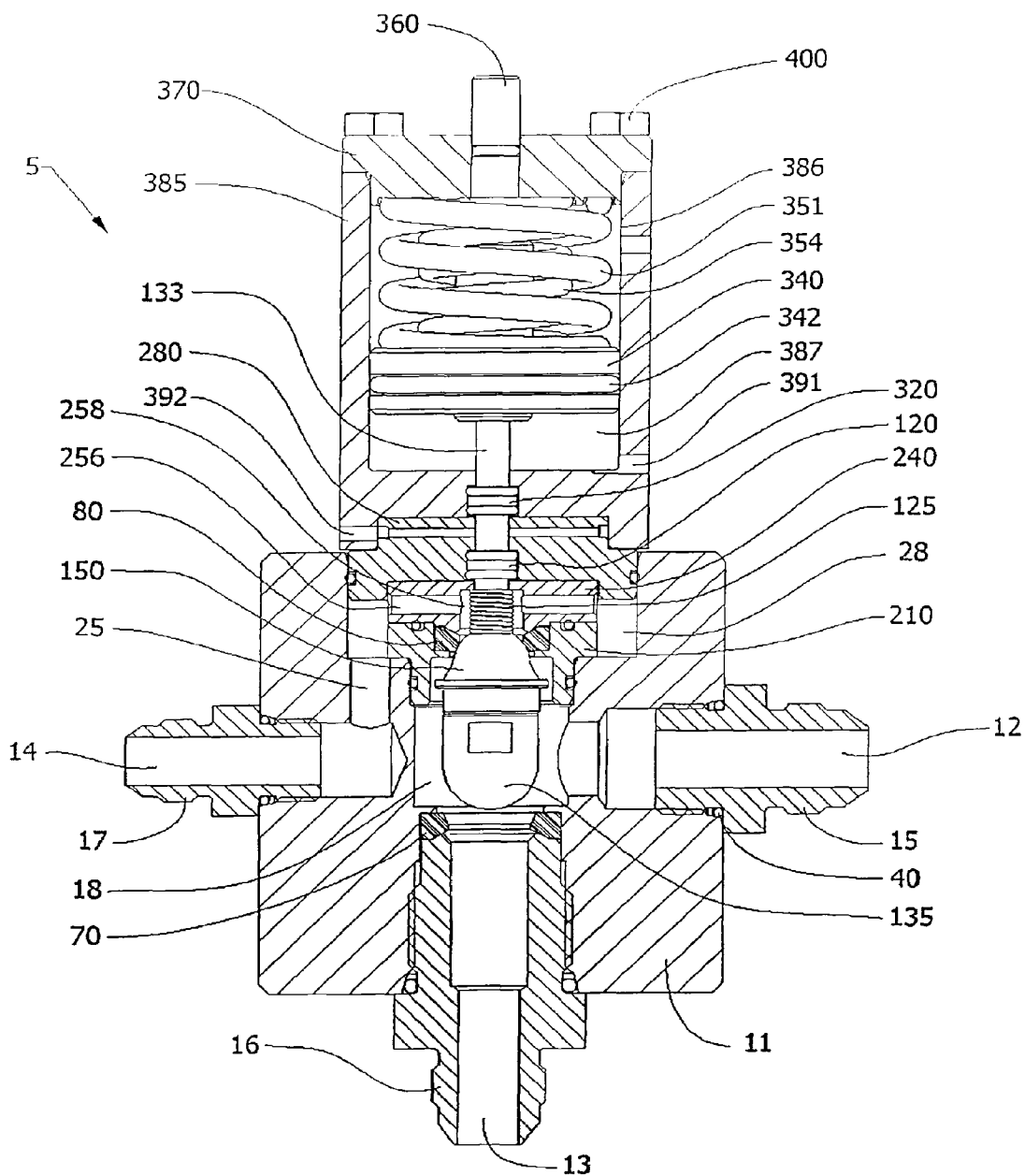
FIG. 2 is a partial cross-sectional view of the poppet valve assembly in a first state.
Figure 3:
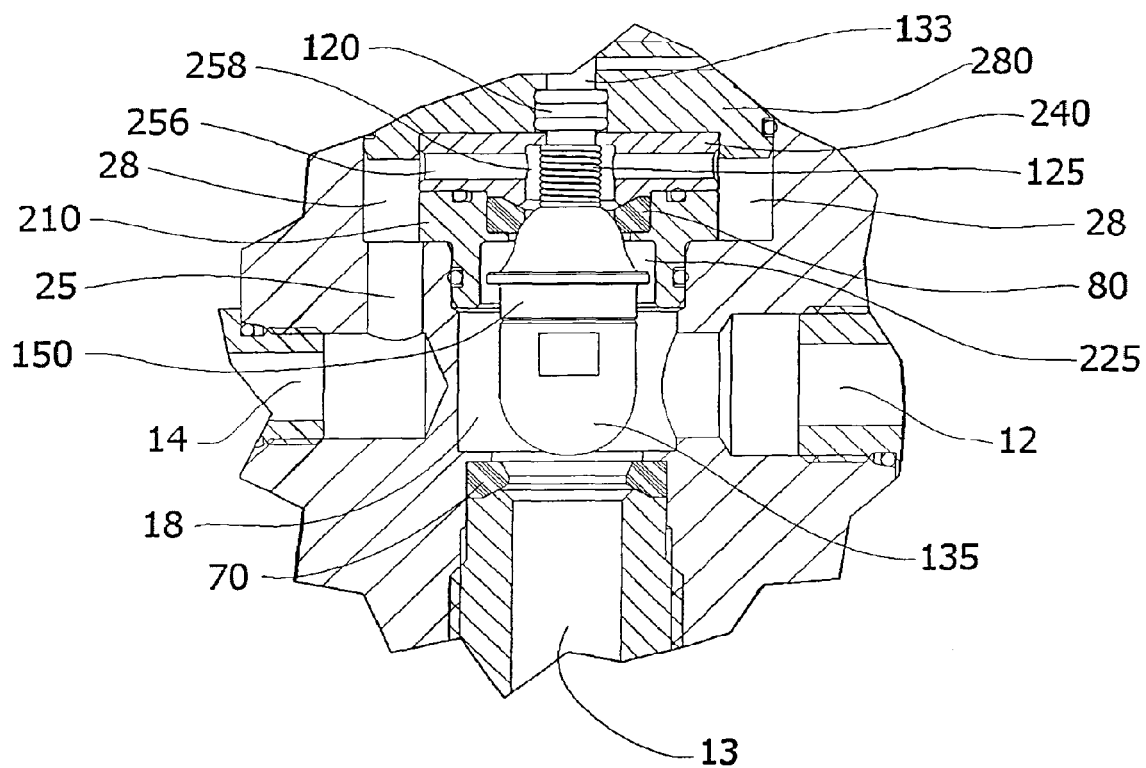
FIG. 3 is an enlarged portion of FIG. 2.

Referring now back to FIGS. 2 and 3, the valve assembly 5 is shown in a first static position where the high pressure inlet port 13 is in direct fluidic communication with the common outlet port 12 while flow from the low pressure inlet port 14 is prevented. The fluid flow path in this first static position is from the inlet port 13 into the inner valve cavity 18 and out through the common outlet port 12. This first valve state is achieved in the preferred embodiment when a pressurized fluid is supplied to the actuation cavity 387 via a supply port 391 in the actuator housing 385 such that the bias force of the pressurized fluid exceeds the bias force of the return springs 351 and 354 and axially moves the piston 340 and also the poppet assembly 180 upwardly until the spherical surface 164 of the sliding poppet 150 mates with a spherical sealing surface 81 of the upper seat 80, effecting a fluid tight seal that prevents flow into the low pressure inlet port 14.

Figure 4:
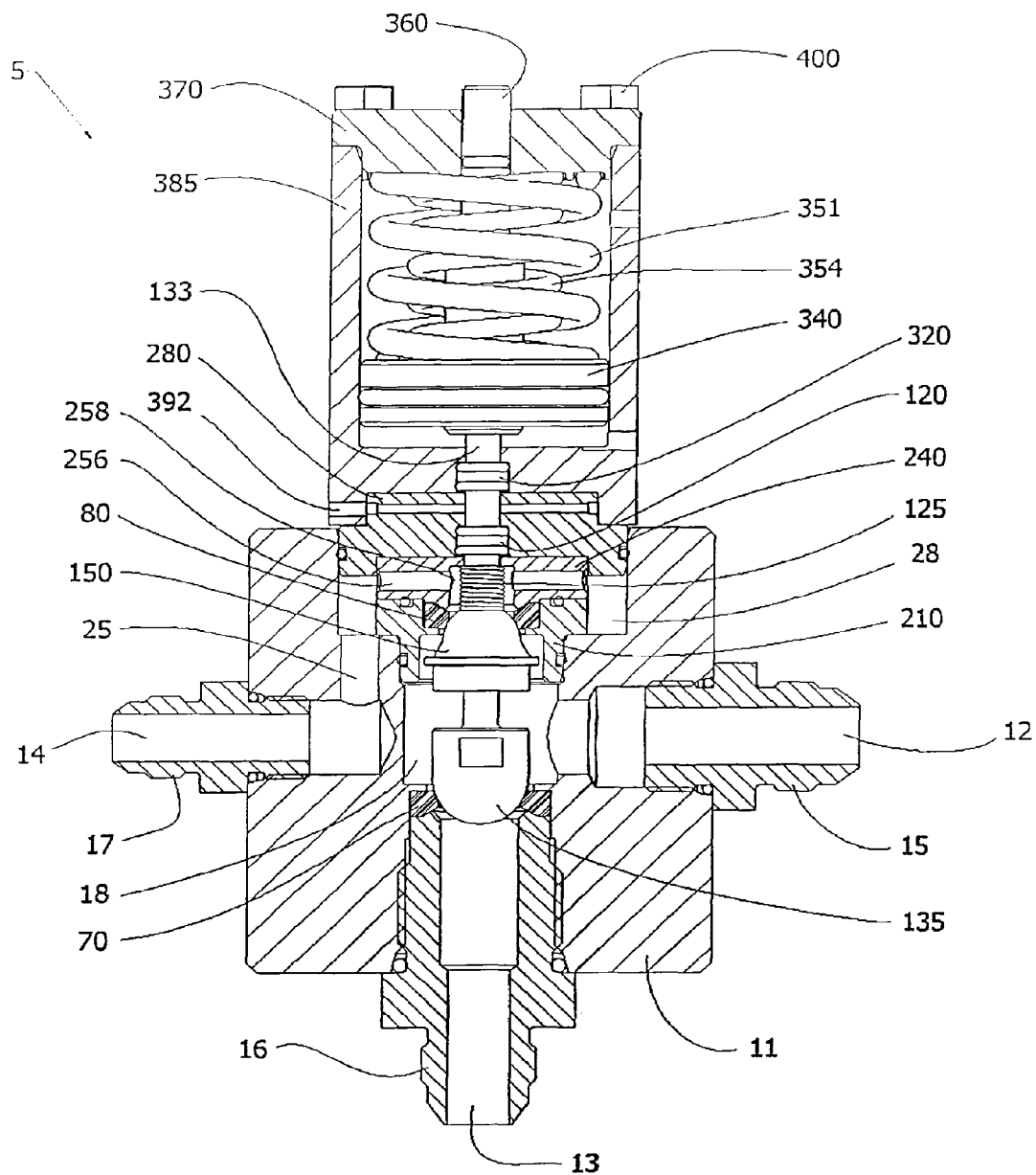
FIG. 4 is a partial cross-sectional view of the poppet valve assembly in a second state.
Figure 5:
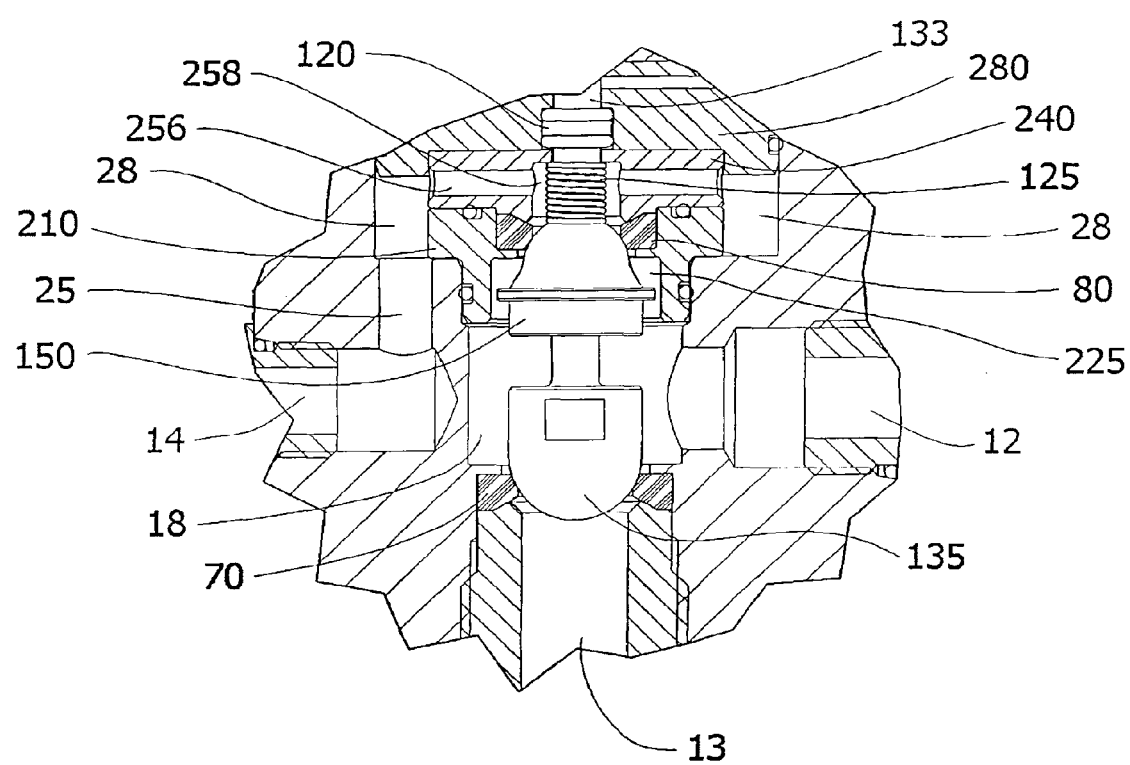
FIG. 5 is an enlarged portion of FIG. 4.

Referring now to FIGS. 4 and 5, the valve assembly 5 is shown in a second static position where neither inlet port 13 nor 14 is in fluidic communication with the common outlet port 12. This second valve state is achieved in the illustrated embodiment when the pressurized fluid is vented from the actuation cavity 387 and the bias force exerted by the return springs 351 and 354 exceeds the bias force induced by the pressure contained within the internal valve cavity 18 exerted on the lower poppet 130. A further condition for this second valve state is that the internal pressure of the valve cavity 18 is greater than the pressure of the low pressure inlet port 14. The valve cavity 18 pressure, acting on the net area of the sliding poppet 150 exerts an upwardly acting bias force. This bias force must be greater than the downwardly acting bias force on the opposing side of the sliding poppet 150. This downward bias force is a combination of two separate forces, the first resulting from the compressed poppet spring 125 and the second resulting from a pressure induced force, generated by the lower pressure of the inlet port 14 acting on the net area of the sliding poppet 150.

In this second state, a spherical surface 132 of the lower poppet head 135 mates with a spherical sealing surface 71 of the lower seat 70, effecting a fluid tight seal that prevents flow from the high pressure inlet port 13 into the inner valve cavity 18. Simultaneously, the spherical surface 164 of the sliding poppet 150 remains mated with the spherical sealing surface 81 of the upper seat 80, effecting a fluid tight seal that prevents flow into the low pressure inlet port 14 in conjunction with the poppet stem seal 161 that provides a fluid tight seal between the lower poppet stem 133 and the counterbore 155 of the sliding poppet 150.

The uniqueness and advantages offered by the new invention are further illustrated when examining the pressure induced biasing forces acting on the valve during this second state. As stated previously, when the actuation cavity 387 is vented of fluid pressure, the bias force of the return springs 351 and 354 must at a minimum exceed the pressure induced upwardly bias force exerted on the lower stem 130 to initiate the axial movement of the piston 340. The magnitude of the upwardly bias force in units of force is the product of pressure, in this case the internal valve cavity 18 pressure, multiplied by the area in which the pressure is acting against. In this case, because the lower poppet 130 is free to move axially independently of the sliding poppet 150, the area only includes the cross section area of the lower poppet stem 133. This area is substantially less than the entire area of the pressure boundary of an inside bore 84 of the seat 80 resulting in a substantially reduced force. The force is reduced by a factor of the square of the radius difference between the lower poppet stem 133 diameter and the radius of the inside bore 84 of the seat 80 as illustrated by the formula for the surface area of a ring $\Pi(R_1^2 - R_2^2)$. This force reduction permits the use of smaller and less costly actuator components than would otherwise be required in a valve without a sliding poppet 150.

Figure 6:
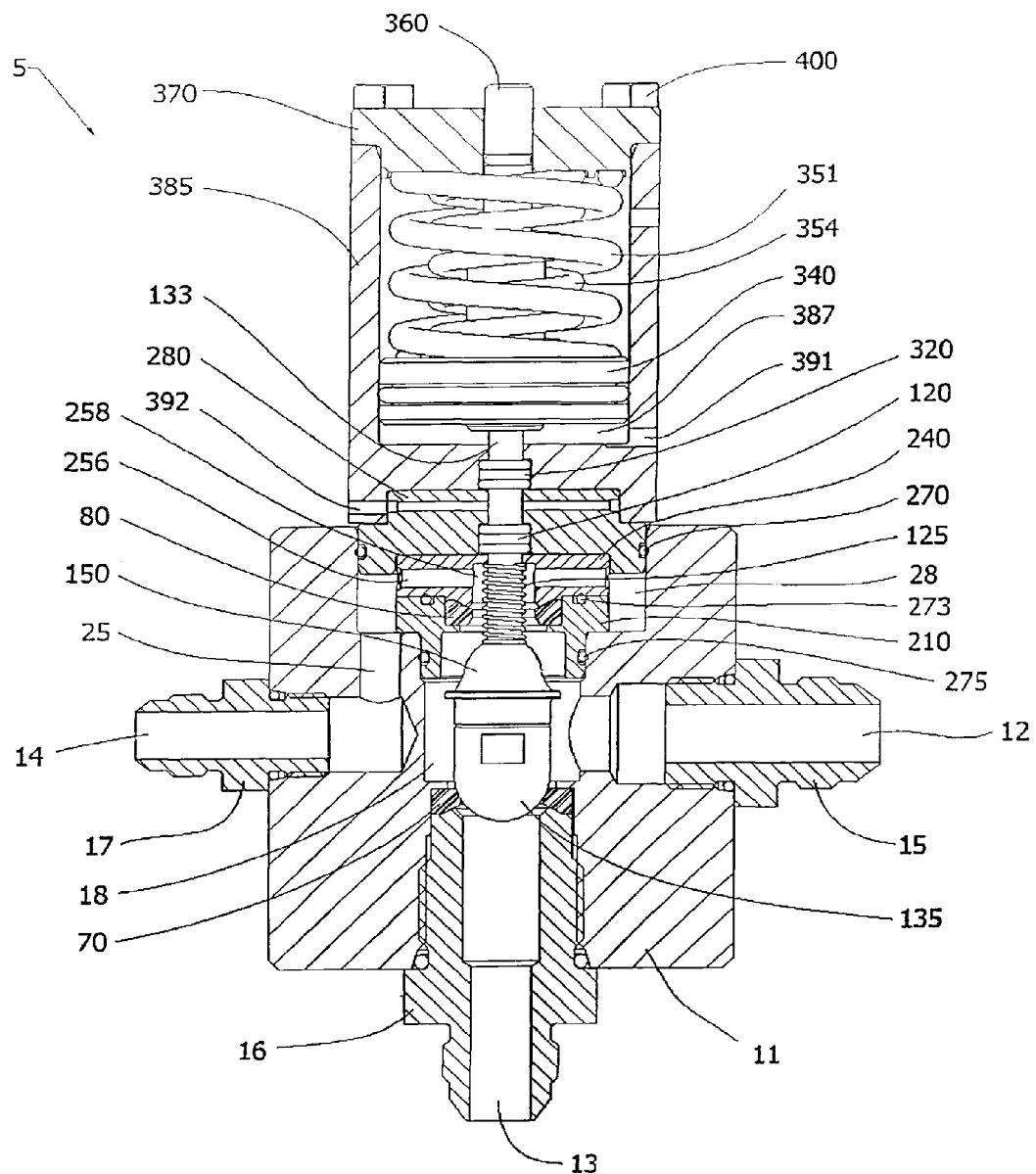
FIG. 6 is a partial cross-sectional view of the poppet valve assembly in a third state.
Figure 7:
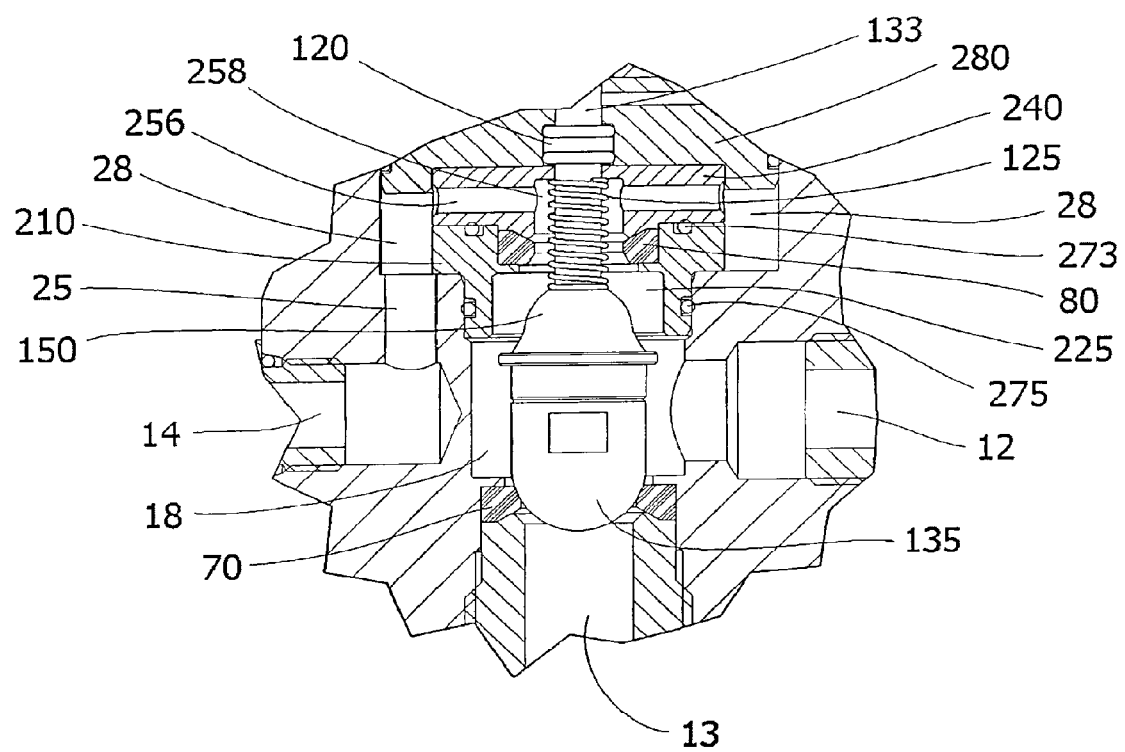
FIG. 7 is an enlarged portion of FIG. 6.

Now referring to FIGS. 6 and 7, the valve is shown in a third static position where the low pressure inlet port 14 is in direct fluidic communication with the common outlet port 12, while flow is prevented from the high pressure inlet port 13. The fluid flow path in this third static position is from the inlet port 14 into the vertical passage 25 in the valve body 11, then into the cavity formed between the outermost bore 28 in the valve body 11 and the outside diameters of the lower bonnet 210 and inner bonnet 240, then into the radial passages 256 of the inner bonnet 240, then into the counterbore 258 of the inner bonnet 240, then into the inner valve cavity 18 and out through the common outlet port 12.

This third valve state is achieved when the pressure in the internal valve cavity 18 is reduced to a predetermined level via outward flow through the common outlet port 12. As the pressure drops in the internal valve cavity 18, the upwardly bias force acting against the sliding poppet 150 is reduced accordingly. The sliding poppet 150 will remain seated against the upper seat 80 until the downwardly bias force exerted on the sliding poppet 150 exceeds the upwardly bias force. Because the pressure induced biasing forces exerted on either side of the pressure boundary across the sliding poppet 150 are applied to equal areas, the sliding poppet 150 will be forced off the upper seat 80 by the additional downwardly bias force exerted on the sliding poppet 150 by the poppet spring 125 while the pressure in the internal valve cavity 18 is higher than the pressure in the low pressure inlet port 14.

The pressure differential at which the sliding poppet 150 will unseat can be established by the design of poppet spring characteristics such as the number of coils, wire diameter, compressed height, etc. to adjust the bias force it applies to the sliding poppet 150 while in the compressed state when the sliding poppet 150 is closed. Because the pressure in the internal valve cavity 18 is higher than the low pressure inlet port 14, there will be an initial amount of back flow towards the low pressure inlet port 14 until pressure is stabilized and forward flow through the valve commences. The amount of back flow depends on the rate of pressure sinkage at the common outlet port 12 and the selected pressure differential where the bias force exerted by the poppet spring 125 will force the sliding poppet 150 off of the upper seat 80. By proper design, the pressure differential can be kept very low, greatly reducing the amount of backflow that would be experienced in a similar three-way poppet valve without the internal check feature of the present invention.

The illustrated embodiment discussed previously is most applicable to those applications where the available pressure drop from inlet to outlet is relatively low and assurance is desired, in the form of an additional downwardly bias force supplied by the poppet spring 125, that the poppet 150 will fully open. Another configuration of the valve is available that can eliminate backflow to the low pressure inlet port 14 and is applicable where the available pressure drop from inlet to outlet is substantially greater. In this configuration, the position of the poppet spring 125 is reversed to the other side of the sliding poppet 150. With the poppet spring 125 in this position, the sliding poppet 150 functions in an identical manner as a typical check valve, providing an upwardly bias force to keep the sliding poppet 150 seated in the upper seat 80 until the low pressure inlet port 14 pressure is higher than the internal valve cavity 18 pressure to a predetermined level at which the pressure induced downwardly bias force exceeds the upwardly bias force from internal valve cavity 18 pressure and the poppet spring 125, forcing the sliding poppet 150 to unseat and flow through the valve to commence. Because the sliding poppet 150 will not unseat until the low pressure inlet port 14 pressure is greater than the internal valve cavity 18 pressure, no backflow will occur. A drop in pressure differential between the inlet port 14 and the internal valve cavity 18 to a level below the unseating differential pressure crack pressure will result in the sliding poppet 150 reseating in the upper seat 80.

In a third configuration, the poppet spring 125 is removed. In this configuration, the check poppet 150 will unseat when the pressure in the inlet port 14 is approximately equal to the pressure in the internal valve cavity 18. Minimal backflow will occur in this configuration.

Turning now to FIGS. 18-22, the sealing mechanisms for sealing the lower poppet 130 with seat 70 and sliding poppet 150 with seat 80 will be described. The following description refers to the seal between the lower poppet 130 and seat 70, but it will be appreciated that the seal between the sliding poppet 150 and seat 80 functions in a similar manner.

The seal between the lower poppet 130 and seat 70 is achieved by a compressive load applied to a spherical seal surfaces 71 of seat 70 by the spherical surface 132 of the lower poppet 130. The compressive load creates a contact surface stress between the poppet spherical surface 132 and the seat spherical seal surface 71 of a magnitude dependent upon the contact area according to the formula of applied force divided by contact area. Generally, with a compressive type seal, the contact stress must reach a certain minimum level before a seal can be achieved. The magnitude of the minimum contact stress required is typically affected by the manufacturing precision of the sealing members, seal material properties such as hardness, and the type of fluid or gas to be sealed.

The seat spherical seal surface 71 is configured to provide for a variable amount of seal area to be in contact with the poppets 130 in order to maintain the contact stress above the minimum required level to provide for consistent seal tightness at low pressure while also providing for increased seal contact area in order to reduce seat stress and minimize plastic deformation at higher pressure. This is achieved by machining or molding the spherical seal surface 71 of the seat 70 with a radius slightly larger than the spherical radius of the poppet 130 and by providing partial support to a back surface 73 of the seat 70 such that a bending moment will develop in the seat 70 due to the force applied by the poppet 130, thereby causing the seat 70 to flex.

Figure 18:
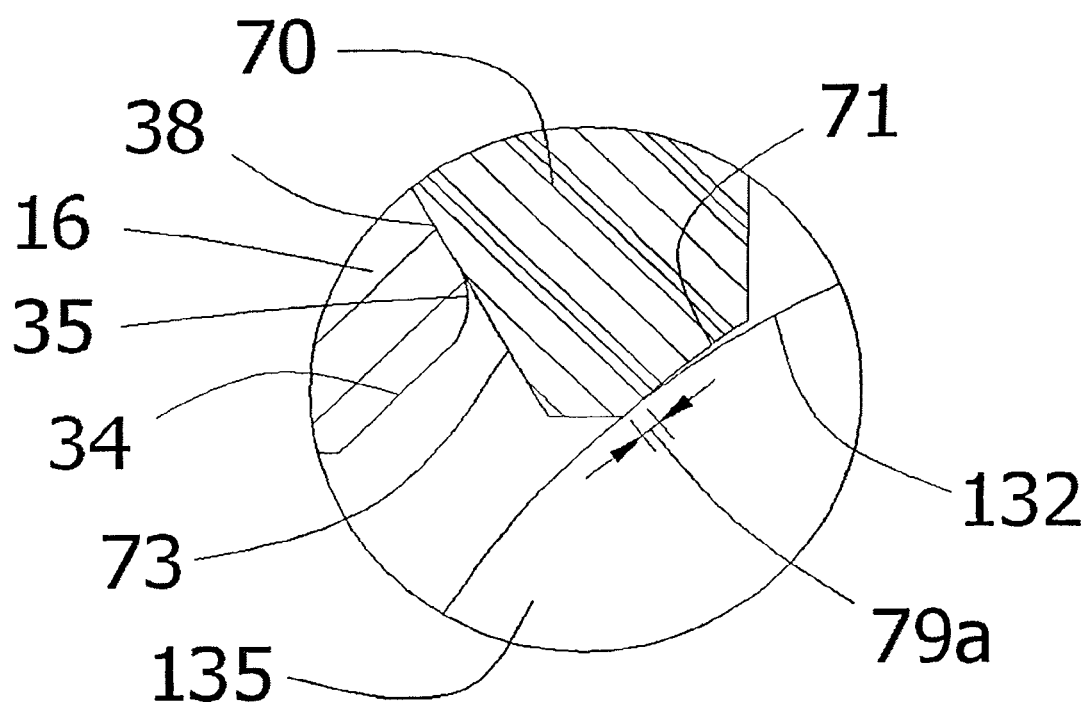
FIG. 18 is an enlarged portion of FIG. 2 showing a seal of the poppet valve assembly in a low pressure seal state.
Figure 19:
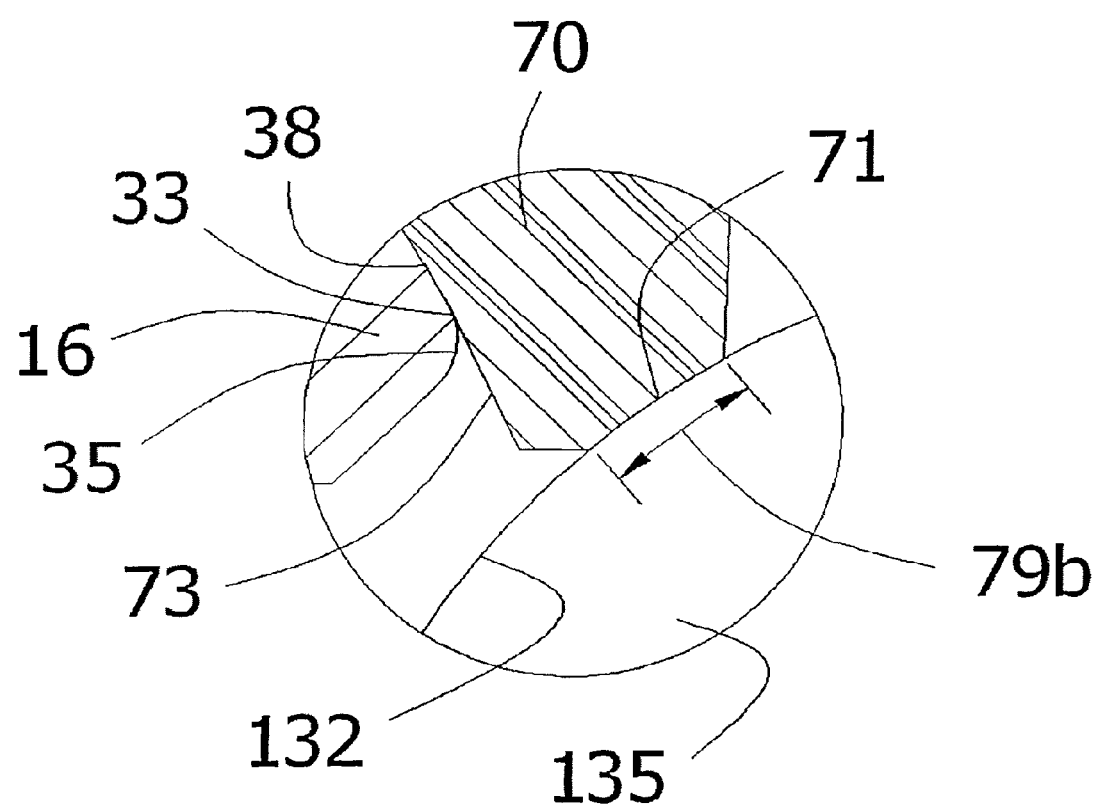
FIG. 19 is an enlarged portion of FIG. 2 showing a seal of the poppet valve assembly in a high pressure seal state.
Figure 20:
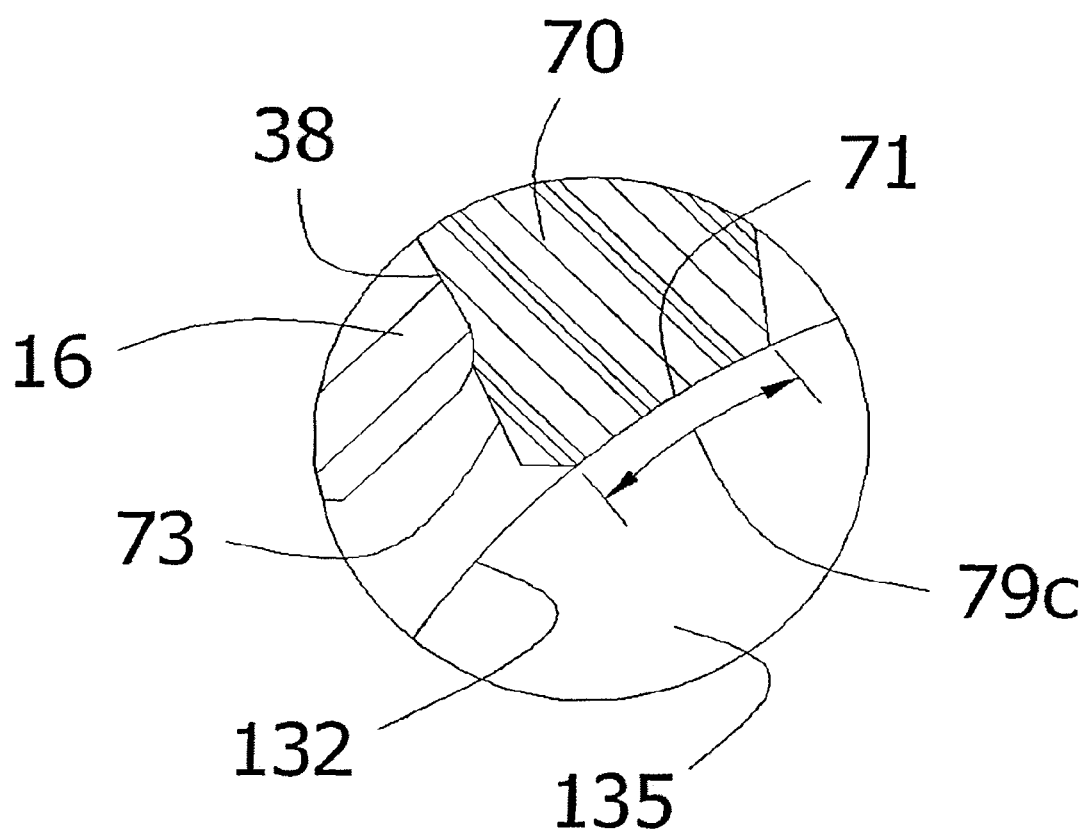
FIG. 20 is another showing a seal of the poppet valve assembly in a high pressure seal state.

Referring to FIG. 18, at low back pressure, only a small area 79a of the seat spherical seal surface 71 is in contact with the poppet spherical surface 132 resulting in high contact stress which improves the low pressure seal. As back pressure increases, the force of the poppet ball 135 pushing into the seat spherical seal surface 71 increases, developing a bending moment in the seat 70. Now referring to FIG. 19, the bending moment results in seat flexure, which exposes an increased area 79b of the seat spherical seal surface 71 into contact with the poppet spherical surface 132. The increased contact area 79b limits the increase in seat stress as pressure increases, preventing significant permanent deformation to the thermoplastic seat 70 over an extended range of pressure while still achieving contact stress above the minimum required to maintain a seal.

The seat 70 can also compensate for high back pressures that result in stress above the plastic deformation range of the thermoplastic material. Now referring also to FIG. 20, as the poppet 130 pushes deeper into the seat spherical seal surface 71, the surface area of the spherical seal surface 71 is enlarged by plastic deformation until stress is redistributed and reduced to levels below the plastic deformation range. The result is a permanent deformation enlargement of the spherical seal surface 71 which provides for an increased seal contact area 79c that can support higher pressure loading.

The plastic deformation of the thermoplastic seat 70 generally will not compromise low pressure seal performance. As the spherical seal surface 71 is deformed, the precision of the spherical surface 71 is improved to more closely match the spherical poppet surface 132. In addition, surface irregularities in the spherical seal surface 71 that result from the original machining or molding process used to manufacture the seat 70 are reduced, producing an improved surface finish that lowers the minimum level of surface contact stress required to achieve a seal.

At elevated temperatures, the thermoplastic seat 70 material expands greatly in volume and softens, which, when under compressive load, can result in significant plastic deformation, commonly referred to as hot flow. The seat 70 is designed to compensate for this condition in two ways. The first is identical to the high pressure compensation described above. The spherical poppet head 135 is forced deeper into the spherical seal surface 71, enlarging the seal contact area 79c until stress is stabilized below the creep range.

Figure 21:
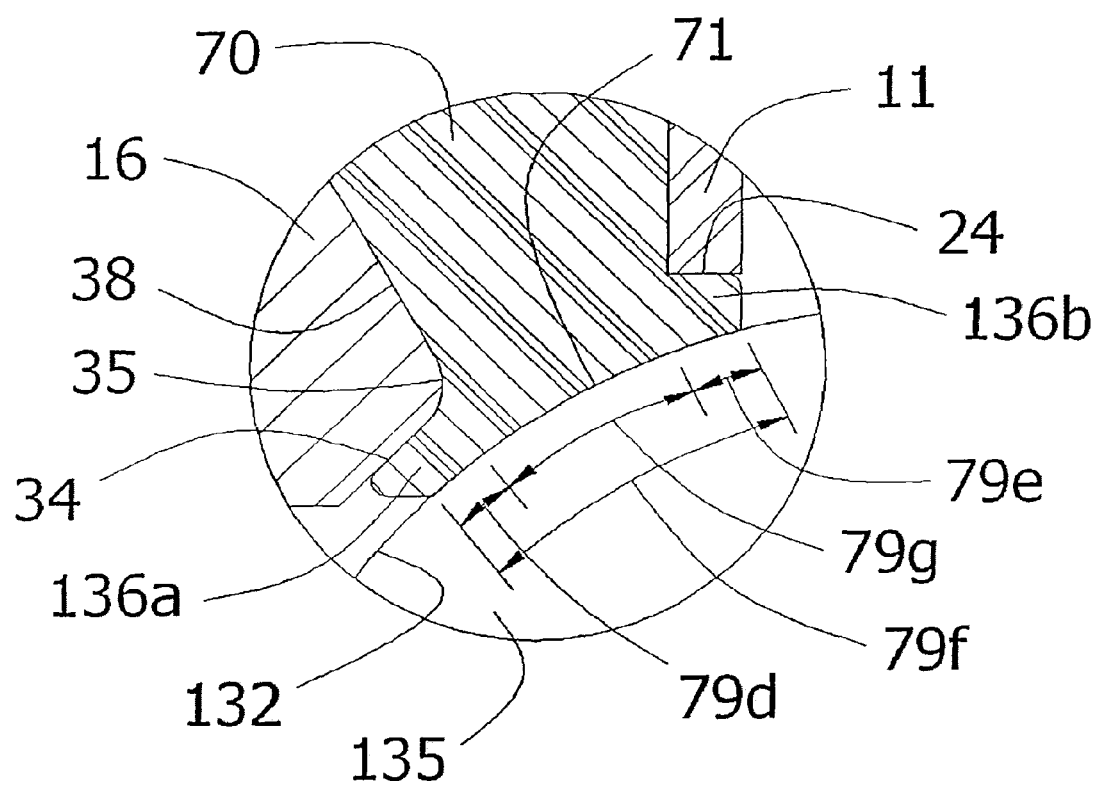
FIG. 21 is another showing a seal of the poppet valve assembly in a high temperature seal state.

Now referring also to FIG. 21, a portion 136a of the seat 70 extrudes in front of the spherical poppet head 135 into a conical bore 34 on the end face of the inlet port adapter 16, creating an additional seal contact area 79d of the spherical seal surface 71. The extruded portion 136a is rigidly supported by the conical bore 34 in the end face of the inlet port adapter 16, which restricts forward spherical poppet head 135 movement and prevents the poppet head 135 from pushing completely through the seat 70 and contacting the surface of the conical bore 34 in the face of the inlet port adapter 16. Another portion 136b of the seat extrudes in the opposite direction between the spherical poppet head 135 and a through bore 23 of the valve body 11. The extruded portion 136b is rigidly supported by a cylindrical wall 24 of the through bore 23 of the valve body 11, creating an additional seal contact area 79e of the spherical seal surface 71. The enlargement of the seal contact area of the seat spherical seal surface 71 resulting from material extrusion continues until seat stress stabilizes below the creep limit.

The desired result of the extrusion of the seat 70 is a total enlarged seal contact area 79f of the seat spherical seal surface 71. The benefit this provides is an increased load capacity of the seat 70, the load being defined as force due to back pressure. The acceptable amount of load for the seat 70 is limited by the yield strength and resistance to creep hot flow of the seat material at temperature a given temperature. Stress being defined as unit load per unit area, therefore an increase in unit area will permit a related increase in unit load while still maintaining identical stress in the material.

As with permanent spherical seal surface 71 deformation due to high back pressure as described above, the plastic deformation of the thermoplastic seat 70 due to high temperature will not compromise low pressure seal performance. As the spherical seal surface 71 deforms, the precision of the surface is improved to more closely match the spherical surface 132 of the poppet head 135. In addition, surface irregularities in the spherical seal surface 71 that result from the original machining or molding process used to manufacture the seat 70 are reduced, producing an improved surface finish that lowers the minimum level of surface contact stress required to achieve a seal.

Figure 22:
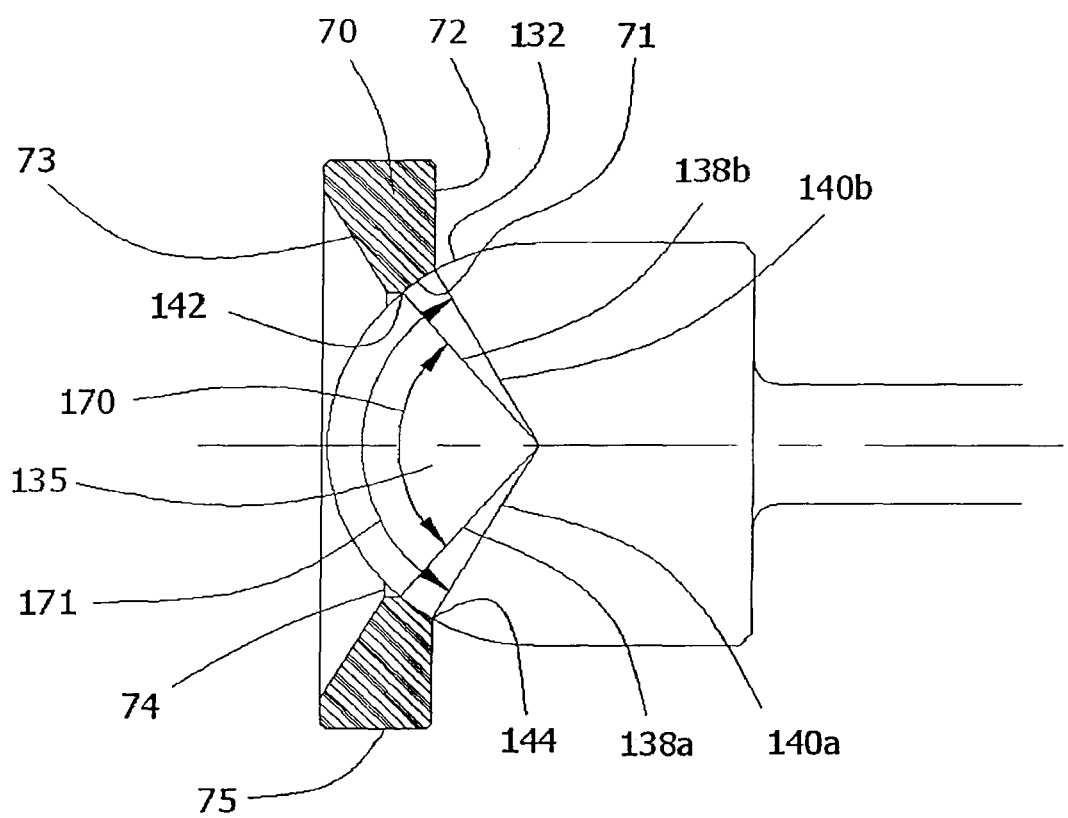
FIG. 22 illustrates the seat geometry of the seal.

Referring now to FIG. 22, the relationship between the size of the spherical diameter of the spherical poppet head 135 to the spherical sealing surface 71 of seat 70 can be adjusted to affect sealing performance to best suit the seat material and pressure and temperature conditions. This relationship is best illustrated by two included angles, 170 and 171, that can be defined by the intersection of the poppet head spherical surface 132 and the spherical sealing surface 71 of the seat 70. The interior angle 170 is defined by two line segments 138a and 138b drawn from the center point of the spherical diameter of the poppet head 135 to the intersection points 142 of the spherical sealing surface 71 and a through bore 74 of the seat 70. The exterior angle 171 is defined by two line segments 140a and 140b drawn from the center point of the spherical diameter of the poppet head 135 to the intersection points 144 of the spherical sealing surface 71 and the flat annular end face 72 of the seat 70.

Interior angle 170 is most important and greatly affects both load capacity and low pressure seal ability of seat 70. Reducing the interior angle 170, accomplished by reducing the size of the through bore 74 relative to the diameter of the spherical poppet head 135, adds surface area to spherical sealing surface 71, increasing the load capacity of the seat 70. However, at the same time, the ability of seat 70 to seal at low pressure is reduced correspondingly as the interior angle 170 is reduced.

The loss of low pressure seal ability as the interior angle 170 is reduced is due to a reduction of mechanical advantage that consequently reduces the magnitude of the force that generates contact stress necessary to effect a seal in the small area 79a of the seat spherical seal surface 71. In effect, the spherical head of the poppet 135 acts as a wedge driven into the seat 70 at low pressure, generating an outwardly radial load against the small area 79a of seat spherical seal surface 71. As identical to a simple wedge, the magnitude of the outwardly radial force can be many times greater than the end force and is commonly referred to as mechanical advantage. The mechanical advantage of a simple wedge is a direct function of the wedge angle, with greater advantage achieved as the wedge angle is reduced. This same effect is observed in the invention, with decreased simple wedge angle that increases mechanical advantage corresponding to increased interior angle 170.

Thus, an improved low pressure seal can be achieved by increasing the interior angle 171, which for a given load due to pressure, increases the force applied by the spherical poppet head 135 on the small area 79a of seat spherical seal surface 71, which in turn results in increased contact stress between the spherical surface 132 of the poppet head 135 and small area 79a of the seat spherical seal surface 71, which in turn extends the lower range of pressure where minimum contact stress necessary to effect a seal in the small area 79a of the seat spherical seal surface 71 can be achieved.

It is therefore reasonable to conclude from the above discussion that there should exist an optimal geometry of interior angle 170 and exterior angle 171, irrespective of the actual size of components, that would provide for optimal sealing performance dependent upon the seat material, desired range of sealing pressure, temperature of application and type of fluid to be sealed. Generally, interior angle 170 varies between 80 degrees for higher pressure applications and 130 degrees for lower pressure applications. Exterior angle 171 generally varies between 110 degrees to 175 degrees, and is established so as to provide an adequate amount of spherical seal surface 71 for a particular seat material to support poppet loading at the maximum pressure and temperature of the application.

An additional advantage of the first preferred embodiment, in which the poppet spring 125 is located above the sliding poppet 150 is made apparent in the detailed description of the unique seal design. As discussed previously, the spherical poppet head 135 will be pushed further into the seat 70 at higher temperatures and pressures resulting in an enlargement of the spherical seal surface 71 of the seat 70. The deformation of the seat 70 is a result of pressure loading that creates stress in the seat 70 that is above the creep range of the seat material. In effect, the entire bearing load of the poppet head 135 is resisted by the seat 70 alone.

However, in the first embodiment the poppet spring 125 does provide additional support to resist the bearing load applied by the sliding poppet 150 on the upper seat 80. The bearing support provided by the poppet spring 125 increases as the deformation of the seat 80 increases because the poppet spring 125 is further compressed by the increased travel of the sliding poppet 150 into the seat 80. It is therefore possible and desirable to design the poppet spring 125 such that it will provide additional pressure and temperature capacity to the valve by effectively limiting excessive deformation of the seat 80 that would otherwise occur if the seat 80 alone was supporting the full bearing load of the sliding poppet 150.

What is claimed is:

1. A poppet valve comprising:
   a valve body having a passage;
   a valve seat element supported by the valve body and having a thermoplastic radially inner spherical sealing surface; and
   a valve element supported for axial movement within the passage and having a spherical sealing surface for engaging the sealing surface of the valve seat;
   wherein the spherical sealing surface of the seat element has a larger spherical diameter than the spherical sealing surface of the valve element.

2. A poppet valve as set forth in claim 1, wherein the seat spherical seal surface is configured to deform under sufficient pressure applied thereto by the valve element to provide for a variable amount of seal area to be in contact with the valve element in order to maintain a contact stress above a minimum level required to provide for consistent seal tightness at low pressure while also providing for increased seal contact area in order to reduce seat stress and minimize plastic deformation of the valve element sealing surface at higher pressure.

3. A poppet valve as set forth in claim 1, wherein the valve seat element is supported by the valve body such that upon application of sufficient pressure by the valve element to the valve seat sealing surface, at least a portion of the valve seat will extrude into a space between the valve body and the valve element providing for further increased seal contact area thereby to reduce seat stress and minimize plastic deformation of the valve element sealing surface at higher pressures.

4. A poppet valve as set forth in claim 1, wherein the valve seat element is made of a non-resilient plastic material.

5. A poppet valve as set forth in claim 4, wherein the plastic material includes one of a thermoplastic or a flouroplastic material.

6. A poppet valve as set forth in claim 5, wherein the thermoplastic and flouroplastic materials are selected from the group consisting of PTFE of filled, unfilled and advanced copolymer grades thereof.

7. A seal assembly for sealing a passageway in a valve comprising:
   a non-resilient plastic valve seat element having a radially inner spherical sealing surface; and
   a valve element having a spherical sealing surface for engaging the sealing surface of the valve seat;
   wherein the spherical sealing surface of the seat element has a larger spherical diameter than the spherical sealing surface of the valve element.

8. A seal assembly as set forth in claim 7, wherein the seat spherical seal surface is configured to deform under sufficient pressure applied thereto by the valve element to provide for a variable amount of contact area with the valve element in order to maintain a contact stress above a minimum level required to provide for consistent seal tightness at low valve pressures while also providing for increased seal contact area in order to reduce seat stress and minimize plastic deformation of the valve element sealing surface at high valve pressures.

9. A seal assembly as set forth in claim 7, wherein the valve seat element is configured to extrude into a space between a valve body in which the valve seat is installed and the valve element providing for increased seal contact area thereby to reduce seat stress and minimize plastic deformation of the valve element sealing surface at higher valve pressures.

10. A seal assembly as set forth in claim 7, wherein the plastic material includes one of a thermoplastic or a flouroplastic material.

11. A poppet valve as set forth in claim 10, wherein the thermoplastic and flouroplastic materials are selected from the group consisting of PTFE of filled, unfilled and advanced copolymer grades thereof.

\* \* \* \* \*